(12) United States Patent
Moon

(10) Patent No.: US 7,146,131 B2
(45) Date of Patent: Dec. 5, 2006

(54) ANTENNA APPARATUS OF RELAY SYSTEM

(75) Inventor: Sung-Joon Moon, Seoul (KR)

(73) Assignee: R-Tron Inc., Seoul (KR)

( * ) Notice: Subject to any disclaimer, the term of this patent is extended or adjusted under 35 U.S.C. 154(b) by 374 days.

(21) Appl. No.: 10/484,438

(22) PCT Filed: Jul. 30, 2002

(86) PCT No.: PCT/KR02/01438

§ 371 (c)(1),
(2), (4) Date: Jan. 28, 2004

(87) PCT Pub. No.: WO03/013025

PCT Pub. Date: Feb. 13, 2003

(65) Prior Publication Data

US 2004/0224629 A1    Nov. 11, 2004

(30) Foreign Application Priority Data

Aug. 1, 2001    (KR) ............................... 2001/46579

(51) Int. Cl.
*H04B 7/15* (2006.01)
(52) U.S. Cl. .................. 455/11.1; 455/7; 455/13.1; 370/315
(58) Field of Classification Search ............ 455/7, 455/11.1, 13.1, 13.3, 13.4, 24, 15; 330/107, 330/295; 343/751; 370/315; 375/211
See application file for complete search history.

(56) References Cited

U.S. PATENT DOCUMENTS 5,600,333 A * 2/1997 Justice et al. ............... 343/713
6,049,307 A * 4/2000 Lim ........................... 342/383
6,459,905 B1 * 10/2002 Fuji .......................... 455/552.1
6,753,823 B1 * 6/2004 Matz et al. ................. 343/760

FOREIGN PATENT DOCUMENTS

EP    0639035    2/1995
KR    1999-13271    3/2001

OTHER PUBLICATIONS

English Language Abstract of Korean 1999-13271.

* cited by examiner

*Primary Examiner*—Quochien B. Vuong
*Assistant Examiner*—Tuan H. Nguyen
(74) *Attorney, Agent, or Firm*—Greenblum & Bernstein, P.L.C.

(57) ABSTRACT

Disclosed is an antenna apparatus of a relay system. The relay system includes a link antenna apparatus transmitting and receiving electric signals to and from a base station, a coverage antenna apparatus transmitting and receiving electric signals to and from subscriber terminals, and a repeater system connected between the link antenna apparatus and the coverage antenna apparatus to bidirectionally amplify electric signals therebetween. The antenna apparatus is one of the link antenna apparatus and the coverage antenna apparatus and includes: at least one radiation element; and a power feeder controlling electric field intensity and phases of signals transmitted from or received by the radiation element, thereby offsetting beam patterns having an influence on antenna isolation of the antenna apparatus. In the power feeder, since phase shifters and attenuators are provided at power-feed lines connected with radiation elements so as to offset the beam patterns, the link and cover-age antenna apparatuses can be disposed adjacent to each other and easily installed at reduced cost, and transmission lines can be shortened, thereby reducing the power loss.

10 Claims, 2 Drawing Sheets

ANTENNA APPARATUS OF RELAY SYSTEM

TECHNICAL FIELD

The present invention relates to an antenna apparatus of a relay system, and more particularly to an antenna apparatus of a relay system which can control an electric field intensity and a phase of a signal received by a radiation element of the antenna apparatus, thereby offsetting a beam pattern having an influence on the antenna isolation.

BACKGROUND ART

In general, a mobile communication system, which is utilized in wireless data communications, personal communication services, wireless local networks, etc., includes a base station, at least one relay system, and subscriber terminals; and the relay system includes a link antenna, a repeater, and a coverage antenna.

The link antenna receives a signal from the base station and transmits the signal to the repeater, and the repeater relays signals between the link antenna and the coverage antenna. Furthermore, the coverage antenna transmits the signal received through the link antenna and the repeater from the base station to a subscriber terminal and transmits a signal received from a subscriber terminal to the repeater.

In the relay system operating as described above, the coverage antenna is located at an opposite position of the link antenna while being spaced a predetermined distance from the link antenna, so that sufficient antenna isolation is secured between the coverage and link antennas, that is, the transmission and reception antennas.

In this case, the antenna isolation signifies the difference between intensities of a signal received by the link antenna from the base station and a signal fed back to the link antenna after being amplified in the repeater and then emitted through the coverage antenna.

When the difference between the intensities of the two signals is small, the signal received by the link antenna generates oscillation of the repeater, and repetitive oscillation of the repeater may cause the repeater to go out of order.

Therefore, in order to prevent the repeater from oscillating, the signal-reception level of the base station must be at least 10 dB higher than the signal-reception level of the repeater.

Conventionally, three methods as described below are usually employed in order to secure proper antenna isolation.

First, a high gain directional antenna having a high front-to-back ratio is used.

Second, distance between the coverage antenna and a donor of the repeater is increased.

Third, antennas are shielded from each other.

In the first method, a channel selector repeater, a microwave repeater, a laser repeater, or an optical repeater may be utilized. However, such repeaters are expensive, and it is difficult to repair and maintain such repeaters.

In the second and third methods, a line as long as an increased physical distance between the antennas must be added, which thereby causes power loss between the repeater and antennas.

Further, the performance of the relay system is deteriorated, thereby reducing service coverage.

Moreover, the three conventional methods are disadvantageous in view of installation and maintenance of equipment, in that it is impossible to employ these three conventional methods in a restricted space, and relatively large expense is required in employing these three conventional methods.

DISCLOSURE OF THE INVENTION

Therefore, the present invention has been made in view of the above-mentioned problems, and it is an object of the present invention to provide an antenna apparatus of a relay system for a mobile communication service, in which phase shifters and attenuators are provided at power-feed lines connected with radiation elements in a power feeder of the relay system, so that the power feeder can control the electric field intensity and phases of signals supplied to the radiation elements, thereby offsetting beam patterns having an influence on antenna isolation of the antenna apparatus, which consequently enables the antenna apparatus to be easily installed at reduced cost and the power loss to be reduced.

It is another object of the present invention to provide an antenna apparatus of a relay system for a mobile communication service, which secures necessary antenna isolation, thereby improving the quality of the mobile communication service.

According to an aspect of the present invention, there is provided an antenna apparatus of a relay system, the relay system including a link antenna apparatus transmitting and receiving electric signals to and from a base station, a coverage antenna apparatus transmitting and receiving electric signals to and from subscriber terminals, and a repeater system connected between the link antenna apparatus and the coverage antenna apparatus to bidirectionally amplify electric signals therebetween, the antenna apparatus being one of the link antenna apparatus and the coverage antenna apparatus, the antenna apparatus comprising: at least one radiation element; and a power feeder controlling electric field intensity and phases of signals transmitted from or received by the radiation element, thereby offsetting beam patterns having an influence on antenna isolation of the antenna apparatus.

Preferably, the antenna apparatus comprises: n (n is an integer larger than or equal to one) radiation elements arranged on a flat plate, each radiation element radiating or receiving signals to be transmitted or received; a power feeder including phase shifters and attenuators provided at power-feed lines connected with the radiation elements, respectively, so that the power feeder can control the electric field intensity and phases of the signals supplied to the radiation elements; and a coupler/distributor combining n signals outputted from the power feeder or distributing a signal through multiple paths of the power feeder.

Also, the antenna apparatus may be a passive antenna apparatus comprising an array of at least one passive radiation element.

Otherwise, the antenna apparatus may be an active antenna apparatus comprising an array of at least one active radiation element requiring electric power.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention.

Figure 1:
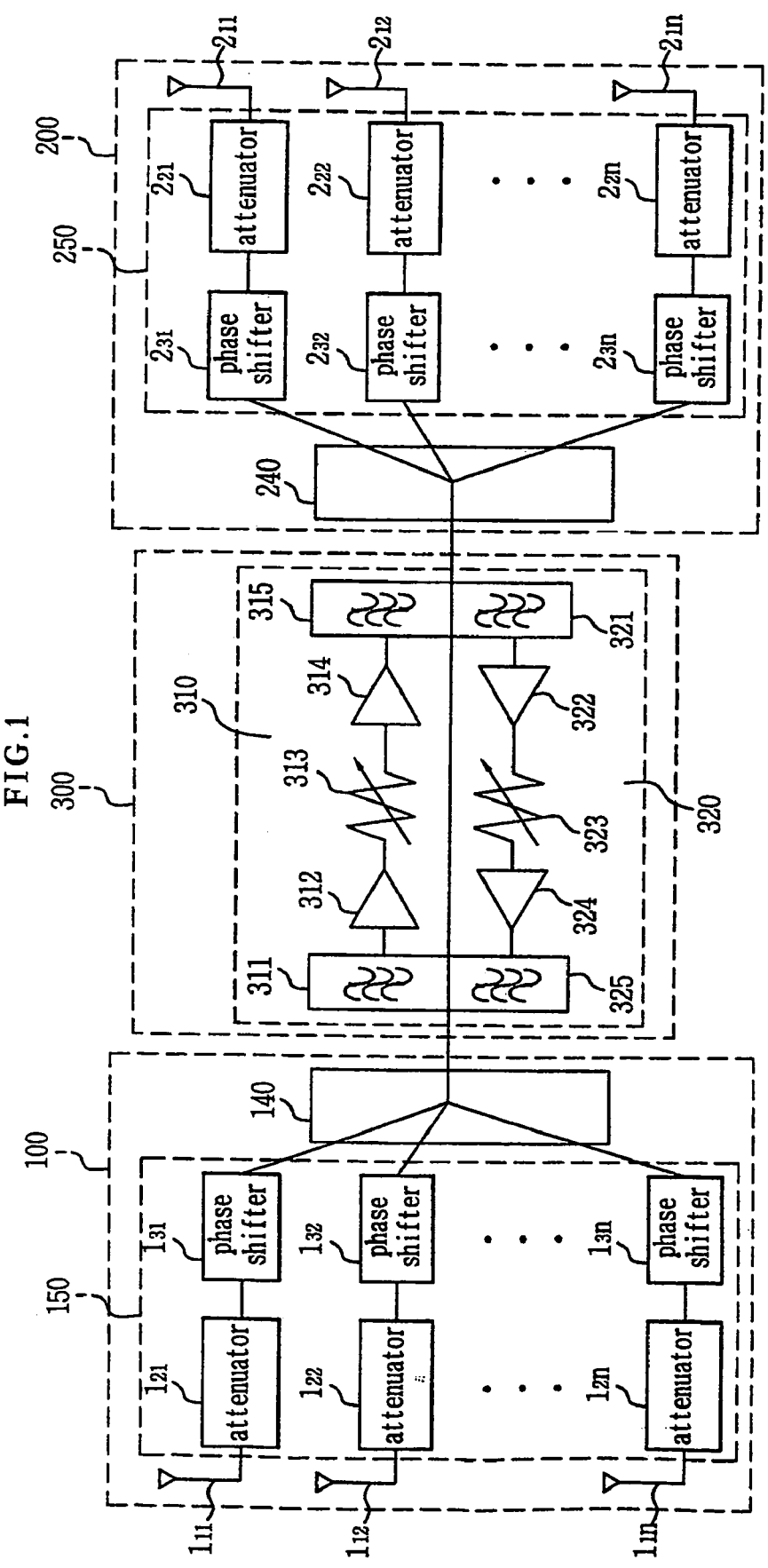
FIG. 1 is a block diagram of a relay system having antenna apparatuses according to the present invention.

Referring to FIG. 1, a relay system having antenna apparatuses according to the present invention includes a link antenna apparatus 100 transmitting and receiving electric signals to and from a base station, a coverage antenna apparatus 200 transmitting and receiving electric signals to and from subscriber terminals, and a repeater system 300 connected with and relaying electric signals between the link antenna apparatus 100 and the coverage antenna apparatus 200.

The link antenna apparatus 100 includes a radiator, a power feeder 150 and a coupler/distributor 140. The radiator includes n (n is an integer larger than or equal to one) radiation elements $1_{11}$ to $1_{1n}$. The power feeder 150 has phase shifters and attenuators. The coupler/distributor 140 distributes and combines signals from the power feeder 150 and transmits the combined signal to the repeater system 300.

The number n of the radiation elements $1_{11}$ to $1_{1n}$ may be changed according to intentions with which the antenna is installed.

In general, as the radiation elements $1_{11}$ to $1_{1n}$, an array of passive antenna radiation elements may be used. In this case, the radiation pattern of the array antenna is determined in consideration of the amplitude and phase of the radiation pattern of each radiation element.

Differently from the passive array antenna, the antenna apparatus the link antenna apparatus 100, or the coverage antenna apparatus 200 may be an active antenna apparatus in which the radiation elements $1_{11}$ to $1_{1n}$ themselves are provided with active devices requiring electric power, such as low noise amplifiers and high power amplifiers, together with duplexers, thereby enabling the antenna apparatus to perform a portion of the function of the repeater system.

In the radiator, n basic radiation elements are arranged on a flat plate, and radiate or receive electric waves.

The power feeder 150 disposed at lower ends of the radiation elements $1_{11}$ to $1_{1n}$ includes phase shifters $1_{31}$ to $1_{3n}$ and attenuators $1_{21}$ to $1_{2n}$, which are connected with the radiation elements $1_{11}$ to $1_{1n}$, respectively, and control the electric field intensity and phase of signals supplied to the radiation elements $1_{11}$ to $1_{1n}$.

The coupler/distributor 140 distributes and combines n signals outputted from the power feeder 150 into a single signal, and transmits the single signal to the repeater system 300.

Since the coverage antenna apparatus 200 has the same construction as that of the link antenna apparatus 100, a detailed description about the construction of the coverage antenna apparatus 200 will be omitted here.

The repeater system 300 is a bilateral signal amplifier employed in order to enable communication in tunnels, buildings, underground spaces, remote mountain places, etc., which are shadow areas for electric wave or areas in which proper communication service cannot be provided.

The repeater system can be realized in various forms which can support mobile communications by Personal Communication System (PCS), International Mobile Telecommunication (IMT) 2000, cellular phones, etc.

The repeater system 300 includes a transmission repeater section 310 and a reception repeater section 320. The transmission repeater section 310 amplifies a forward signal received through the link antenna apparatus 100 from the base station to a predetermined level and outputs the amplified signal to the coverage antenna apparatus 200. The reception repeater section 320 amplifies a backward signal received through the coverage antenna apparatus 200 from a terminal to a predetermined level and outputs the amplified signal.

The transmission repeater section 310 includes a first duplexer 311, a low noise amplifier 312, a first attenuator 313, a first driving amplifier 314, and a second duplexer 315. The first duplexer 311 filters and outputs the forward signal received through the link antenna apparatus 100. The low noise amplifier 312 reduces noise of the signal outputted from the first duplexer 311. The first attenuator 313 attenuates the signal outputted from the low noise amplifier 312. The first driving amplifier 314 amplifies the signal outputted from the first attenuator 313 to a level which enables the signal to operate a terminal. The second duplexer 315 filters the signal amplified by the first driving amplifier 314 and outputs the filtered signal to the coverage antenna apparatus 200.

Correspondingly to the transmission repeater section 310, the reception repeater section 320 includes a third duplexer 321, a second driving amplifier 322, a second attenuator 323, a high power amplifier 324, and a fourth duplexer 325. The third duplexer 321 filters and outputs the backward signal received through the coverage antenna apparatus 200 from a terminal. The second driving amplifier 322 amplifies the signal outputted from the third duplexer 321 to a predetermined level. The second attenuator 323 attenuates the signal outputted from the second driving amplifier 322. The high power amplifier 324 high-power amplifies the signal outputted from the second attenuator 323. The fourth duplexer 325 filters the signal outputted from the high power amplifier 324 and outputs the filtered signal to the link antenna apparatus 100.

Since the repeater system has the same construction as that of a conventional repeater, a detailed description about the construction of the repeater system will be omitted here.

Figure 3:
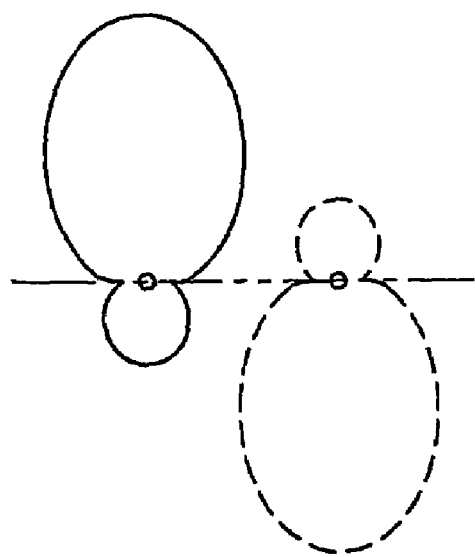
FIG. 3 is a view illustrating a beam pattern of antenna apparatuses in a relay system according to the present invention.

FIG. 3 is a view showing a beam pattern of the antenna apparatus in the relay system as described above.

Figure 2:
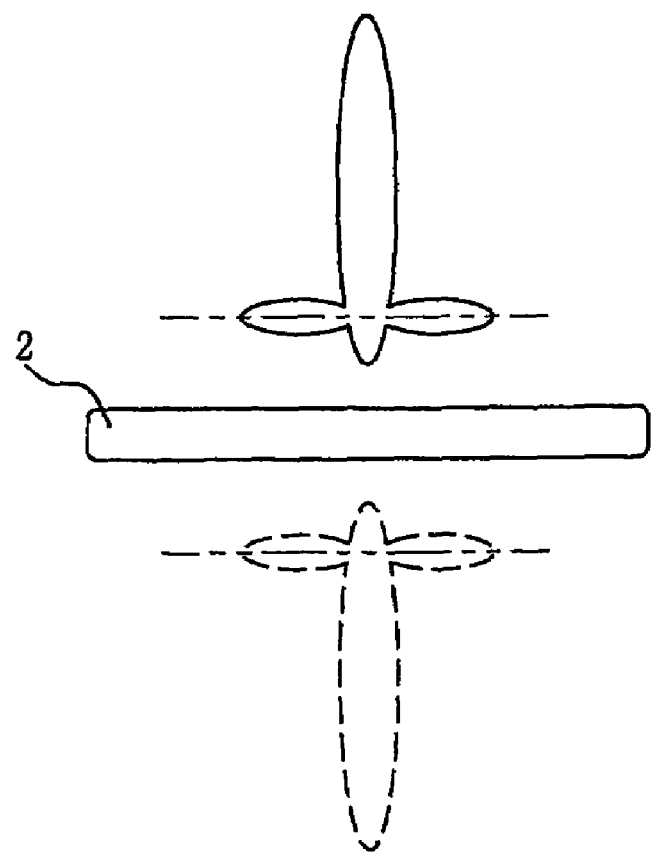
FIG. 2 is a view illustrating a beam pattern of antennas in a conventional mobile communication relay system.

Referring to FIG. 2 showing a beam pattern of the conventional antenna, the coverage antenna and the link antenna are spaced from each other while a natural feature or object 2 is disposed between the coverage antenna and the link antenna, so as to prevent the beam patterns of the coverage antenna and the link antenna from having an influence on each other due to their side lobes.

However, as apparent from the beam patterns shown in FIG. 3, the beam patterns of the coverage antenna and the link antenna are isolated from each other even without employing a natural feature or object 2 in a relay system according to the present invention.

This is because the power feeder 150 or 250 of the antenna apparatus 100 or 200 controls the electric field intensity and phases of the signals transmitted from or received by the radiation elements $1_{11}$ to $1_{1n}$, thereby offsetting beam patterns having an influence on the antenna isolation.

For example, directions of the beam patterns of the entire link antenna apparatus 100 can be made different from each other by adjusting the phase shifters $1_{31}$ to $1_{3n}$ in such a manner that the phase of the second radiation element $1_{12}$ makes an angle of three degrees and the phase of the third radiation element $1_{1n}$ makes an angle of six degrees with reference to the first radiation element $1_{11}$. By shifting locations of the side lobes through properly controlling the phase shifters $1_{31}$ to $1_{3n}$ of the radiation elements $1_{11}$ to $1_{1n}$, the desired beam patterns can be obtained. In this case, the sizes of the side lobes can be controlled by the attenuators $1_{21}$ to $1_{2n}$.

Reflection plates, antenna supporters, power feeder shielding materials, etc. may be disposed between the link antenna apparatus 100 and the coverage antenna apparatus 200, in order to increase the antenna isolation between the link antenna apparatus 100 and the coverage antenna apparatus 200.

The antenna isolation can be increased by attaching a plurality of sheets of reflection plates to the antenna apparatus at predetermined intervals. Further, antenna supporters made from fiberglass reinforced plastics (FRP) instead of aluminum, which is a common material of an antenna, may be used, so as to increase the antenna isolation.

Further, power-feed lines between the antenna apparatuses and the repeater system also have an effect on the antenna isolation. In fact, each of the power-feed lines itself may function as an antenna, thereby deteriorating the antenna isolation. Therefore, in order to prevent this deterioration and increase the antenna isolation, a mesh grid having a function of absorbing electric waves of the power-feed line may be disposed between the link antenna apparatus and the coverage antenna apparatus, so as to shield the link antenna apparatus and the coverage antenna apparatus from each other.

INDUSTRIAL APPLICABILITY

As can be seen from the foregoing, an antenna apparatus according to the present invention may be used for signals of a broad frequency band, such as signals for mobile communications, television broadcasting, FM broadcasting, etc. Especially, the antenna isolation secured by the present invention directly relates with the quality of service in the field of mobile communication, so that the present invention enables future development and operation of communication equipment to be carried out and communication service to be provided with good quality and at a low price.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An antenna apparatus of a relay system, the relay system including a link antenna apparatus transmitting and receiving electric signals to and from a base station, a coverage antenna apparatus transmitting and receiving electric signals to and from subscriber terminals, and a repeater connected between the link antenna apparatus and the coverage antenna apparatus to bidirectionally amplify electric signals therebetween, the antenna apparatus being one of the link antenna apparatus and the coverage antenna apparatus, the antenna apparatus comprising:
   at least one radiator; and
   a power feeder controlling electric field intensity and phases of signals transmitted from or received by the radiator, thereby offsetting beam patterns having an influence on antenna isolation of the antenna apparatus,
   wherein the power feeder comprises at least one attenuator and at least one phase shifter, the radiator, the attenuator and the phase shifter being serially connected with each other, and
   wherein the repeater comprises a transmission repeater comprising a first duplexer, a low noise amplifier, a first attenuator, a first driving amplifier and a second duplexer which are serially connected with each other, and a reception repeater comprising a third duplexer, a second driving amplifier, a second attenuator, a high power amplifier and a fourth duplexer which are serially connected with each other.

2. The antenna apparatus of the relay system as claimed in claim 1, wherein the antenna apparatus comprises:
   the radiators arranged on a flat plate, each radiator radiating or receiving signals to be transmitted or received;
   the phase shifters and attenuators provided at power-feed lines connected with the radiator, respectively, so that the power feeder can control the electric field intensity and phases of the signals supplied to the radiators; and
   a coupler/distributor combining signals outputted from the power feeder or distributing a signal through multiple paths of the power feeder.

3. The antenna apparatus of the relay system as claimed in claim 1, wherein the antenna apparatus is a passive antenna apparatus comprising an array of at least one passive radiator.

4. The antenna apparatus of the relay system as claimed in claim 1, wherein the antenna apparatus is an active antenna apparatus comprising an array of at least one active radiator requiring electric power.

5. The antenna apparatus of the relay system as claimed in claim 1, wherein a predetermined object is disposed between the link antenna apparatus and the coverage antenna apparatus, so as to increase the antenna isolation between the link antenna apparatus and the coverage antenna apparatus.

6. The antenna apparatus of the relay system as claimed in claim 5, wherein the predetermined object is a reflection plate, an antenna supporter made from fiberglass reinforced plastics (FRP), or a material shielding the power-feed lines of the power feeder.

7. The antenna apparatus of the relay system as claimed in claim 2, wherein the antenna apparatus is a passive antenna apparatus comprising an array of at least one passive radiator.

8. The antenna apparatus of the relay system as claimed in claim 2, wherein the antenna apparatus is an active antenna apparatus comprising an array of at least one active radiator requiring electric power.

9. The antenna apparatus of the relay system as claimed in claim 2, wherein a predetermined object is disposed between the link antenna apparatus and the coverage antenna apparatus, so as to increase the antenna isolation between the link antenna apparatus and the coverage antenna apparatus.

10. The antenna apparatus of the relay system as claimed in claim 9, wherein the predetermined object is a reflection plate, an antenna supporter made from fiberglass reinforced plastics (FRP), or a material shielding the power-feed lines of the power feeder.

* * * * *